Oct. 13, 1959 D. R. CLEMONS 2,908,067
METHODS OF MAKING ELECTRICAL CAPACITORS
Filed April 9, 1956
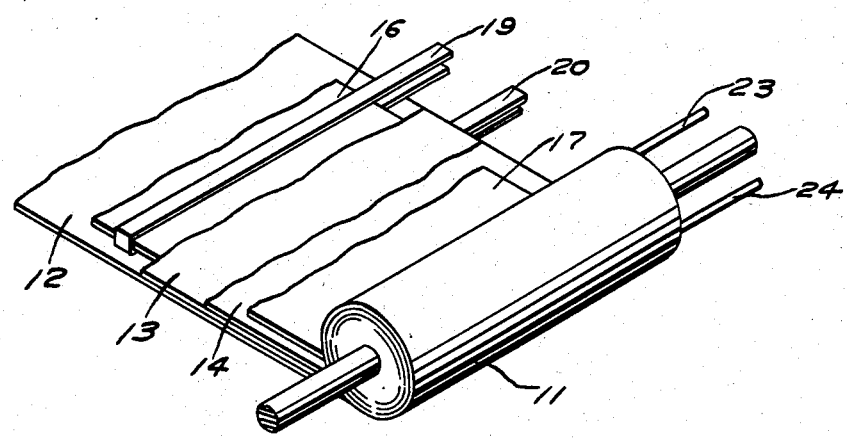
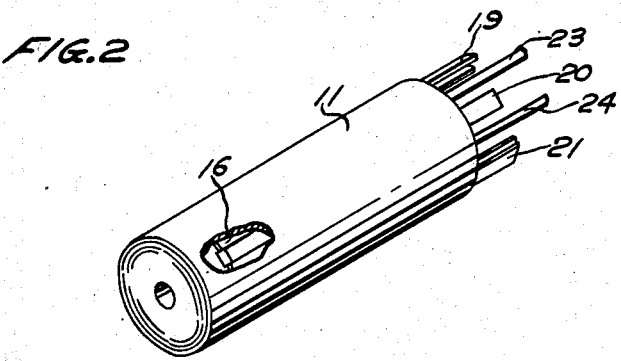
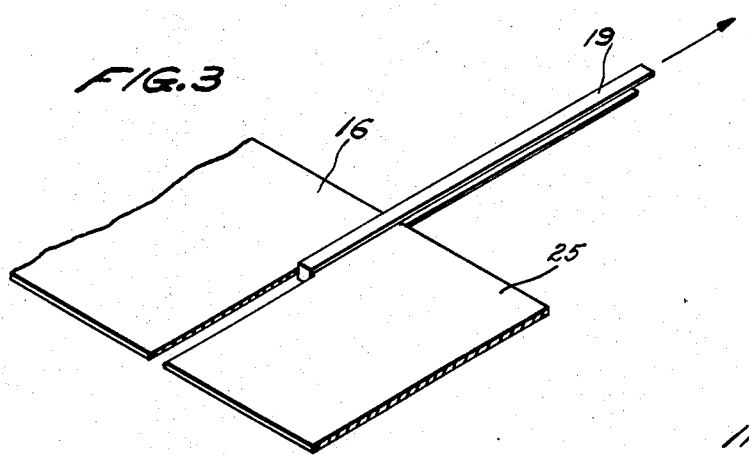
INVENTOR
D. R. CLEMONS
BY C. B. Hamilton
ATTORNEY

United States Patent Office 2,908,067
Patented Oct. 13, 1959

2,908,067

METHODS OF MAKING ELECTRICAL CAPACITORS

Dale R. Clemons, Riverside, Ill., assignor to Western Electric Company, Incorporated, New York, N.Y., a corporation of New York Application April 9, 1956, Serial No. 577,044

4 Claims. (Cl. 29—25.42)

This invention relates to methods of making electrical capacitors and more particularly to methods of making adjusted electrical capacitors.

An object of this invention is to provide new and improved methods of making adjusted electrical capacitors.

Another object of this invention is to provide a method of making electrical capacitors and adjusting them by reducing the effective area of electrodes therein.

In a method of making adjusted electrical capacitors illustrating certain features of the invention, a plurality of electrode strips separated by insulating strips are wound into a spiral roll. A plurality of spaced dielectric strands are looped transversely around one of the electrodes near one end thereof, whereby, after the winding operation is completed, the dielectric strands may be selectively pulled from the roll to sever portions of the electrode to reduce the capacitance to the roll to a predetermined value.

Other objects and advantages of the invention will become apparent by reference to the following detailed description and the accompanying drawing illustrating a preferred embodiment of the invention, in which Fig. 1 is a perspective view of a plurality of electrode strips and dielectric strips partially unwound from the roll to show the positions of the dielectric strands therein;

Fig. 2 is a perspective view of the wound roll with a portion broken away to show the dielectric strands positioned therein before any of them are pulled out to adjust the capacitance of the roll; and Fig. 3 is a fragmentary view of one of the electrode strips unrolled to show the manner in which it is severed when one of the dielectric strands is pulled out of the roll, the strip being shown in this view as only partly severed.

Referring now in detail to the drawing, Fig. 1 shows a partially wound cylindrical spiral roll 11 which is made up of interleaved dielectric strips 12, 13 and 14 and foil electrode strips 16 and 17. A plurality of dielectric strands 19, 20 and 21 are manually looped around the foil electrode strip 16 at spaced intervals from its outer end as the strips are wound into the roll 11. Terminals 23 and 24 are positioned in engagement with the electrode strips 16 and 17, respectively, and are wound into the roll 11. Fig. 2 shows the dielectric strands 19—21 positioned in the roll 11 after the winding operation is complete. The roll 11 is then bound by the application of glue of a well-known type to the outer end of the dielectric strip 12, which is the outer strip in the roll 11. The binding of the roll 11 is permanent and finishes the capacitor as far as assembly is concerned. The capacitance is yet to be adjusted.

After glue is applied to the end of the outer dielectric strip 12 to retain the roll 11 in its cylindrical shape, the capacitance of the roll 11 is tested by a testing device (not shown) of a well-known type connected to the terminals 23 and 24. With the capacitance of the roll 11 initially above a predetermined desirable value, the looped dielectric strand 19, which is the strand nearest the outer end of the foil strip 16 is manually pulled from the roll 11 to sever the strip 16 as illustrated in Fig. 3. A portion 25 (Fig. 3) of the foil electrode strip 16 between the strand 19 and the outer end of the strip 16 is now ineffective, since it is severed from the strip 16.

The capacitance value of the roll 11 is again tested and, if it is still above a desirable value, the dielectric strand 20, which is the second strand from the outer end of the foil strip 16, is pulled out to again sever the foil strip 16 and thereby further reduce the effective area thereof. This procedure is continued until the capacitance value of the roll 11 is at a predetermined desirable value. The dielectric strands remaining in the roll 11 (if any) are left there, since they do not interfere with the use of the capacitor.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. The method of making electrical capacitors, comprising looping dielectric strands at spaced intervals around one of a plurality of electrode layers, interleaving the electrode layers with a plurality of dielectric layers, permanently securing the interleaved layers together to form a finished capacitor body, and selectively pulling out one or more of the looped strands to sever said one electrode layer for lowering the capacitance of the capacitor body.

2. The method of making electrical capacitors, comprising assembling a plurality of electrode layers and dielectric layers into interleaved relationship, looping a strand around one of the electrode layers, winding the electrode and dielectric layers into a roll, permanently securing the roll to form a finished capacitor, and then pulling the strand from the roll to sever said one electrode layer whereby a portion of it is rendered ineffective.

3. The method of making electrical capacitors, comprising assembling a plurality of electrode layers and dielectric layers into interleaved relationship, looping a plurality of dielectric strands around one of the electrode layers at spaced intervals, winding the electrode layers and dielectric layers into a roll, permanently binding the roll to form a finished capacitor, and then sequentially pulling one or more of the dielectric strands out of the roll for severing said one electrode layer to reduce the capacitance of the roll to a predetermined desirable value.

4. The method of making electrical capacitors, comprising assembling a plurality of dielectric strips and electrode strips into interleaved relationship, looping a plurality of dielectric strands around one of the electrode strips at spaced intervals from one end of said strip so that when one of the strands is pulled it severs the electrode strip to render ineffective that portion of the electrode strip between said pulled strand and said one end of the electrode strip, winding the interleaved electrode strips and dielectric strips into a roll, permanently securing the roll to form a finished capacitor, and then sequentially pulling one or more of the dielectric strands out of the roll to reduce the capacitance of the roll to a desirable value, said sequence of pulling beginning with the dielectric strand nearest said one end of the electrode strip.

References Cited in the file of this patent

UNITED STATES PATENTS 2,024,558   Wilson _____ Dec. 17, 1935